United States Patent [19]

Hodson

[11] 4,253,698
[45] Mar. 3, 1981

[54] THEFT GUARD FOR AUTOMOTIVE GASOLINE TANK

[76] Inventor: Hollis C. Hodson, P.O. Box 114, Amo, Ind. 46103

[21] Appl. No.: 48,532

[22] Filed: Jun. 14, 1979

[51] Int. Cl.³ .................. E05B 65/00; E05B 65/12; E05B 65/40; E05C 21/00
[52] U.S. Cl. .................................. 296/1 C; 70/77; 70/159; 70/237; 292/1; 292/203
[58] Field of Search ............... 296/1 C; 292/1, 203, 292/146; 70/164, 158, 159, 77, 161, 237, 258

[56] References Cited
U.S. PATENT DOCUMENTS

| 1,473,001 | 11/1923 | White | 70/159 X |
| 2,486,790 | 11/1949 | Lane | 292/1 |
| 2,508,218 | 5/1950 | Brewer | 292/1 |
| 2,729,500 | 1/1956 | Dickenshied et al. | 296/1 C X |
| 2,798,759 | 7/1957 | Frederick et al. | 296/1 C |
| 2,869,918 | 1/1959 | Kromer | 296/1 C |
| 3,704,606 | 12/1975 | Russek, Jr. | 296/1 C X |
| 3,905,637 | 9/1975 | Smith | 296/1 C |

FOREIGN PATENT DOCUMENTS

| 79427 | 3/1894 | Fed. Rep. of Germany | 292/203 |
| 189994 | 6/1964 | Sweden | 70/158 |

OTHER PUBLICATIONS

Page 225 from *Popular Science*, Apr. 1956, (Magazine), Popular Science Publishing Co., Inc., 355 Lexington Ave., NY, NY, 10017.
Page 144 from *Popular Science*, Jul. 1947, (Magazine).

*Primary Examiner*—Richard E. Moore
*Assistant Examiner*—Carl F. Pietruszka

[57] ABSTRACT

For automotive use, an inexpensive gasoline tank theft guard adjustably attached so that owner may integrate the guard or not by choice of a quick manual setting. The guard utilizes a gasoline fill-tube cover, a lockable body-entry panel, and the owner's key and perhaps his license plate for intercepting access to the gasoline tank when cover and panel are proximate and closed, and for protection against gasoline theft when entry panel is locked. By way of example, a pin (10, FIGS. 3-6), pivotally anchored inside gasoline fill-tube cover (6) engages a receptacle (9) in the trunk lid (2) when the lid closes (FIG. 5). Owner's key (1) unlocks lid to free pin. Anchor heads (4, FIG. 3) are concealed behind mounted license plate (7, FIG. 4) and are designed to frustrate tampering. Stability and rattle of the adjustable pin are controlled manually (FIG. 7) and automatically (FIG. 8). Pin (10) pivots manually aside to disconnect the system.

7 Claims, 8 Drawing Figures

THEFT GUARD FOR AUTOMOTIVE GASOLINE TANK

TECHNICAL FIELD

This invention relates generally to automotive and vehicle accessory equipment, more specifically to guards of a protective system designed to frustrate attempted theft of gasoline from an automotive gasoline tank.

BACKGROUND ART

Whereas theft of gasoline from a vehicle is an ever-present annoyance, there are numerous control methods known and used by the automotive industry and also devices known and available to the consuming public. Such methods and devices include: the tank fill-tube hidden behind a self closing cover without more; some sort of solidly attached interference means disposably blocking the fill-tube area; a cover for the fill-tube which cover is separately keyed from the outside or made to release from the inside; and the gasoline tank cap with a built-in lock and keyed separately.

Applicant is not aware of any cheap and simple gasoline theft protective means or system for a vehicle, which means or the like is so designed that, once integrated, its use or not is optionally disposable with quick ease, and whereas if used, it may be instrumented by an owner's car key secondarily.

DISCLOSURE OF INVENTION

Automotive gasoline theft is a problem for which many vehicle manufacturers provide some measure of protection. Concealment of the fill-tube is not a sufficient deterrent. Where a fill-tube cover is keyed, another key is a necessity, and often such covers can be opened with a knife blade and the like or forced open with a screwdriver. Where a cover catch is controlled from inside the vehicle, again the coder can be pried and buckled open. Keyed gasoline caps in general are more effective than other means but they are not of a standard nature and again require the extra one-use key.

One solution for the theft annoyance is an inexpensive protective guard designed to be so frustrating to overcome by forced entry that the effort and the time consumed is too risky to be worth the chance taken. Such a solution also contemplates authorized entry by simple use of the owner's individualized car door or trunk key; and guard use is optional.

The subject invention combines a receptacle in a lockable body entry panel, such as a trunk lid or a door, with a protruding pin made a part of a gasoline fill-tube cover which is proximate to the lockable panel. This guard intercepts access to the fill-tube whenever both cover and panel are shut and protects against gasoline theft when the lockable panel is locked. A rear end fill-tube cover may utilize the owner's license plate to hide the guard.

Two examples are described which allow authorized entry to the tank when an unlocked trunk lid springs up. A protruding pin anchored to a combined license-plate holder and fill-tube cover situated below the trunk is trapped in the trunk lid when the lid closes. The same entrapment principles adapt when a fill-tube cover is alongside a door. This pin is further described as adjustably attached in order that it may be used or not as a matter of choice.

The object of the invention is to provide a cheap, simple, and reliable system of protection which can be reasonably built into the manufacture of vehicles, or can be offered in accessory form for addition to adaptable unprotected models.

Advantages appear in the cramped area around the guard. Considerable metal must be moved around to gain any forced entry. Where the license plate would need to be removed, an illegal act is compounded. Time as well as noisy tools are required for tampering inasmuch as use of heat would not be sensible. In addition to the features of resistance, a real advantage is the opportunity for an owner to use his own car key, something already a part of his close possessions.

BEST MODE FOR CARRYING OUT THE INVENTION

Figure 1:
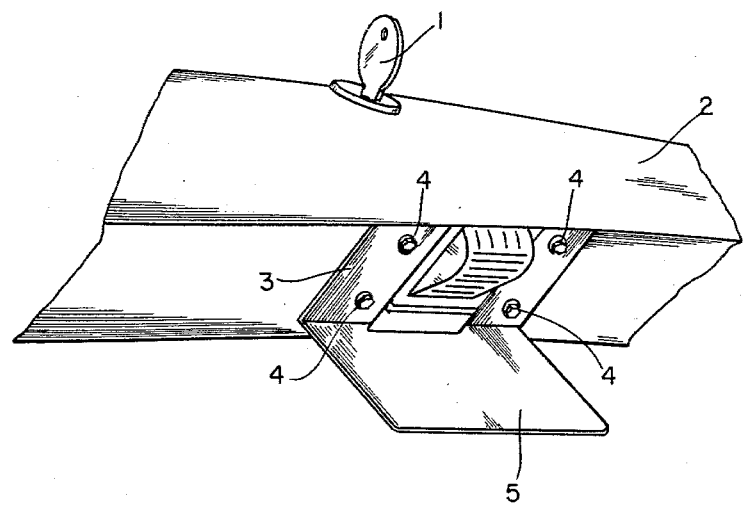
FIG. 1 is a perspective view behind the lip of a raised trunk lid showing a conventional bracketed guard permanently anchored thereon for closed protection against gasoline theft.
Figure 2:
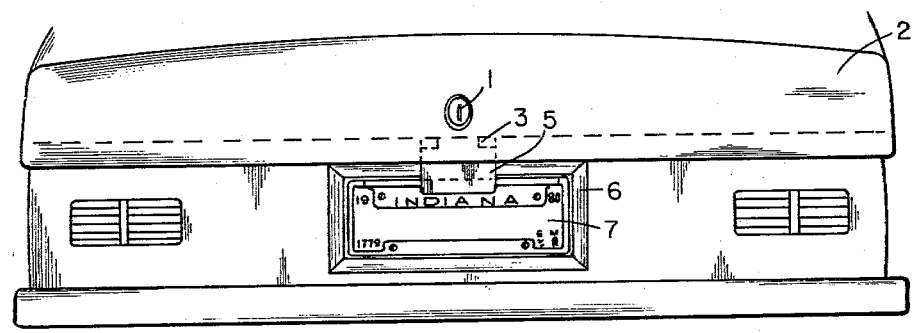
FIG. 2 is a frontal view showing the permanent-type guard overlapping a gasoline cap cover panel when the trunk lid is shut.

In the drawings, FIGS. 1 and 2 illustrate a conventional bracket-type theft guard for a vehicle gasoline tank and like all other known theft guards the heavy anchorage requires substantial effort to remove, even by choice. A side effect is that, once mounted behind a keyed panel, the guard prevents a driver from ever refueling without using a key or surrendering it to an attendant--until or unless he removes the entire protective factor. The subject theft guard illustrated in FIGS. 3 to 8 allows use by choice, intermittently, and by manual setting.

Cramped quarters under the lip of a closed trunk lid, a hatchback, or door, require time for tampering as well as requiring a lamp and selective tools to attempt removal of anything integrated under the said lip, all in all increasing risk of detection. To force open the obstructing panelling requires heavy tools and severe distortion of considerable metal, again a frustrating deterrent to furtive acts.

Figure 3:
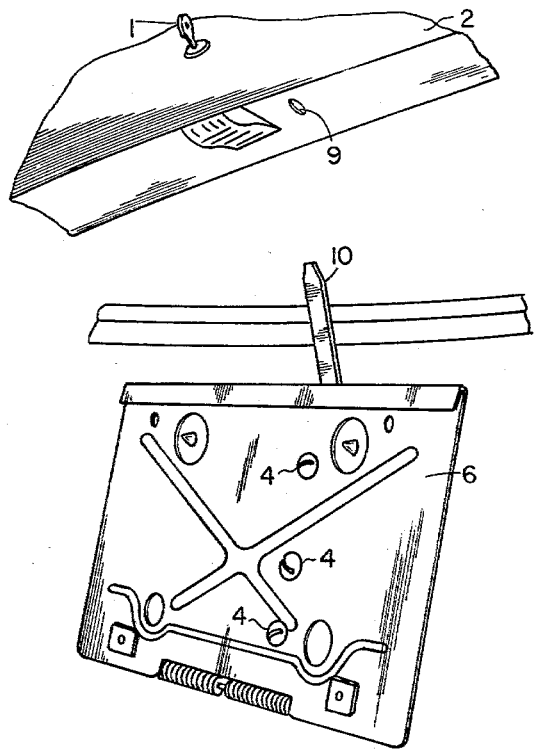
FIG. 3 is a perspective view showing a pin anchored inside a gasoline fill-tube cover; also shown is the pin receptacle inside an open trunk lid.
Figure 4:
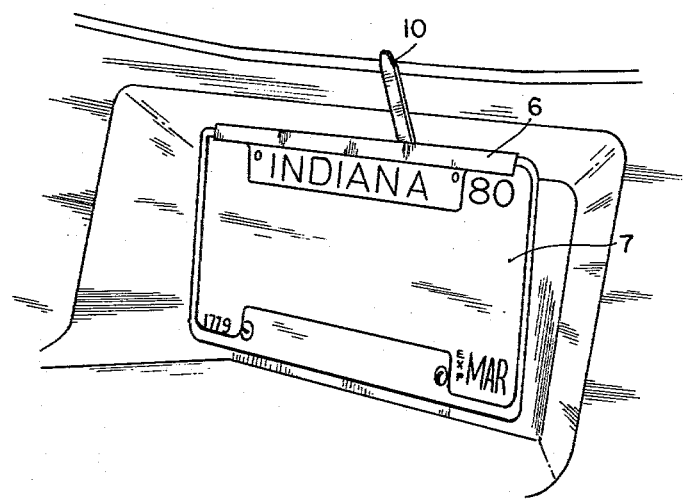
FIG. 4 shows a license plate fitted to the fill-tube cover after the pin is anchored.
Figure 5:
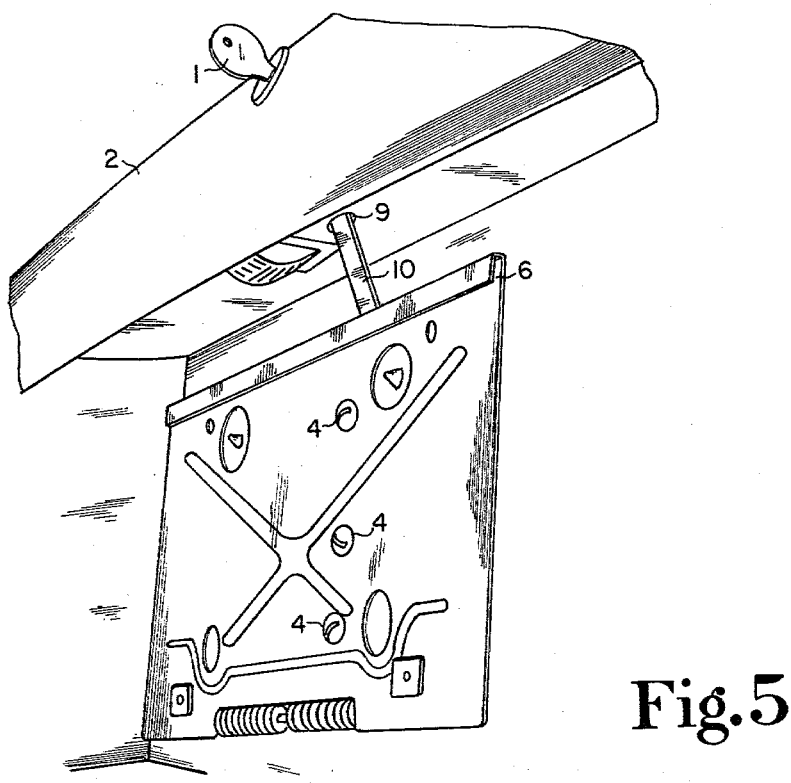
FIG. 5 shows the pin engaging the receptacle in the trunk lid as the trunk lid is shut.

A preferred mode of protective system utilized the car owner's license plate 7, FIG. 4, in combination with a protruding pin 10 and accommodating receptacle 9 as illustrated in FIGS. 3 and 5, which pin 10 was mounted inside cover 6 as an accessory item. Pin 10 and a receptacle could as well be incorporated in prime assembly and in diverse ways as exemplified in FIGS. 6–8.

In FIG. 3, pin 10 was about ½" (1¼ cm) wide, of about 10 gauge steel, and of length sufficient to span the height of cover 6 and extend beyond about 2" (5 cm).

In the examples, FIGS. 3–8, pin 10 was about 8" (20 cm) in height, the top 2" (5 cm) being angled slightly forward and tapered to meet and facilitate engagement with receptacle 9 of FIGS. 3 and 5. Receptacle 9 was about a ½" (1¼ cm) hole selectively located through support sheet metal behind and about 1½" (3¾ cm) above the lip edge of trunk lid 2. In FIG. 5, pin 10 met and entered receptacle 9 when lid 2 was lowered to close. When lid 2 was shut, pin 10 protruded through the steel rimmed receptacle and beyond to a depth of about ½" (1¼ cm) thus rendering cover 6 unopenable until trunk lid 2 was unlocked by key 1, FIGS. 3 and 5, and the lid slightly raised.

Figure 6:
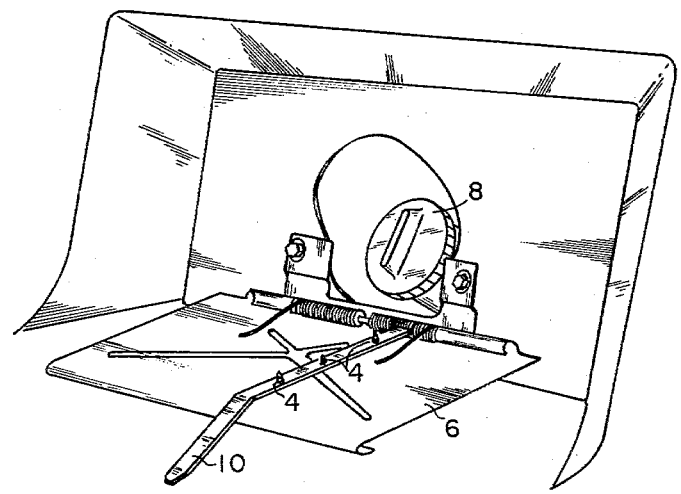
FIG. 6 shows positioning and anchoring of the pin inside the fill-tube cover.

FIG. 6 shows sufficient anchoring of pin 10 to the inside of cover 6, i.e., attachment by at least two metal screws 4, or spot welds. It was preferred to use three anchors as in FIG. 7 wherein upper and lower anchors 13a and 13b were ¼" (6.4 mm) stove bolts, or machine screws, of about ¾" (19 mm) length and were button-headed by drawn stop nuts 15 (acorn nuts). Thus, in effect, any outside attempted removal of upper and lower anchors 13 resulted in nothing more than a frustrating rotation of anchors 13 without being able to remove anything. This arrangement enabled the like-sized middle anchor 14 of FIG. 7 to be drawn down for firmness and to avoid rattle, whereas, in the unlikely event that with led 2 locked said middle anchor 14 were loosened, and even removed, pin 10 would nevertheless remain in place by virtue of the yielding but unremovable anchors 13a and b.

Figure 7:
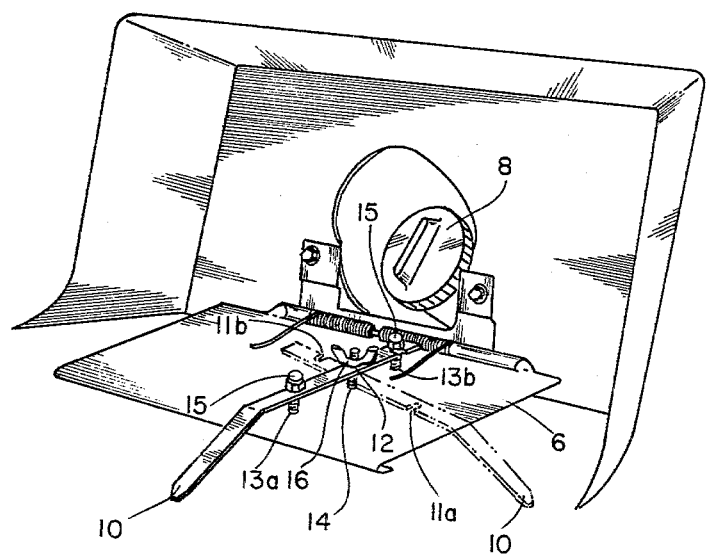
FIG. 7 shows the pin adjustably anchored to the cover panel at alternative settings and secured by manual control.
Figure 8:
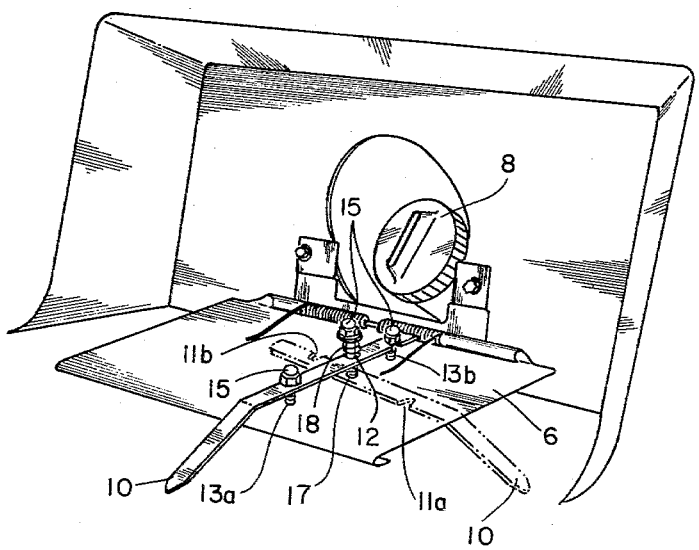
FIG. 8 shows the pin adjustably anchored to the fill-tube cover at alternative settings and held by pressure control.

Whereas it would be convenient at times to disengage pin 10 from its normal upright locking position, for example, on long trips, or when the driver might not wish to leave his car or surrender his key to another, or when loading and unloading a rear end, FIGS. 7 and 8 illustrate this convenience arrangement. In FIGS. 7 and 8, the mounting holes in pin 10 for upper and lower anchors 13a and b are slotted as at 11a and 11b respectively such that pin 10 can pivot up to about 90° around middle anchor 14 of FIG. 7 and 17 of FIG. 8 as shown in those drawings by dotted lines. To tighten pin 10 in any chosen position, FIG. 7 shows a wing nut 16 which was manually tightened until firm. The preferred adjustable connection was that shown in FIG. 8 wherein middle anchor 17 was a bolt of about 1¼" (3¼ cm) capped by a drawn acorn stop nut 15 thus allowing use of about ½" (1¼ cm) of a spiral compression spring 18 worn around the leg of bolt 17 between pin 10 and stop nut 15. Such arrangement maintained even firm pressure on pin 10 wherever set, and selective positioning of pin 10 was done by manually urging pin 10 to whatever radial position desired between limits.

In both FIGS. 7 and 8, respective middle anchors 14 and 17 each wore a lockwasher and hex nut (not apparent) between the inside of cover 6 and pin 10, which hex nuts were drawn tight onto cover 6 where they also served as smooth pivot bases for pin 10 when occasion required rotating the pin.

It is to be noted that, in FIGS. 6–8, when the license plate 7 was normally fitted onto cover 6, as in FIG. 4, all anchor heads were concealed between the plate 7 and the outside of cover 6. The value of this arrangement is apparent when it is considered that an unauthorized removal of the license plate 7 would not only require risky time but also would compound the illegal act of attempted gasoline theft.

INDUSTRIAL APPLICABILITY

It is submitted that a gasoline theft guard could be reasonably planned into the manufacture of most automotive vehicles by reasonable provision for addition, or addition made, of a theft guard accessory to better protect against gasoline tank intrusion, which accessory should be inexpensive, easy to attach, and subject to individual and selective control in accordance with, or in similar mode to, ways and means described above.

All materials described are readily available, easily machinable, and comparatively inexpensive in view of the small quantities required. All involved shop procedures and all described hardware items are standard.

Alternative heavy duty materials: pin 10 of FIGS. 3–8 could be made of small angle or channel iron with accommodating receptacle opening; 13a and b anchors, FIGS. 7 and 8, could be posts or slip-fit rivets.

What is claimed is:

1. On an automotive body having a closeable gasoline fill-tube cover proximate to a lockable body-entry panel, which said tube cover and said entry panel are equipped and disposed such that said cover is protectively trapped by said panel whenever both said cover and said panel are closed, the improved gasoline theft guard combination wherein said cover has a selectively formed and rigid pin pivotally connected to said cover, which said pin, in normal attitude, traverses and protrudes from said cover toward said entry panel when both are closed, wherein said panel is provided with means for engaging said pin upon closing of said panel, and said pivotal connection permitting said pin to pivot parallel to said cover, whereby said combination provides a disconnect means for alternatively setting said pin out of normal attitude with respect to said panel when closed.

2. The improved gasoline theft guard combination of claim 1 wherein said disconnect means employs a hand operated wing nut as a lock nut on a pivot post, which said post is bound to said cover and passes through said pin.

3. The improved gasoline theft guard combination of claim 1 wherein said disconnect means includes a stop nut on a pivot post of selective length, which said post is bound to said cover, passes through said pin, and additionally, wears a compression spring between said pin and said stop nut.

4. The improved gasoline theft guard combination of claim 1 wherein said pin further comprises slots on opposite sides of said pivot, and is supportively connected to said cover by anchor means including posts connected to said cover for engaging respective of said slots, and said posts wearing button-shaped heads for enabling pivotal mesh and release of said pin, for, when said pin is in normal attitude, flexibly securing said pin and frustrating external tampering.

5. On an automotive body having a gasoline fill-tube cover proximate to a lockable body-entry panel, which said tube cover and said entry panel are equipped and disposed such that said cover is protectively trapped by said panel whenever both said cover and said panel are closed, the improved gasoline theft guard combination wherein said cover is a closeable lid over the vehicle fill port and said combination further comprises:

a. a selectively formed and rigid pin pivotally connected to the inside of said cover, which said pin traverses and protrudes from said cover when and wherein said pin is in normal attitude of pointing toward said entry panel from said cover in closed attitude;

b. anchor means buttoning said pin inside said cover for frustrating external tampering;

c. a selective receptacle for said pin disposed within said entry panel for integrating said cover and said panel when said pin is in normal attitude and said entry panel closes; and d. said pivotal connection permitting said pin to pivot parallel to said cover thereby providing manual disconnect means for avoiding union of said cover in conjunction with said panel when both are in the closed position.

6. The improved gasoline theft guard combination of claim 5 wherein said disconnect means employs a hand operated wing nut as a lock nut on a pivot post, which said post is bound to said cover and passes through said pin.

7. The improved gasoline theft guard combination of claim 5 wherein said disconnect means includes a stop nut on a pivot post of selective length, which said post is bound to said cover, passes through said pin, and additionally, wears a compression spring between said pin and said stop nut.

* * * * *